US007875822B2

(12) United States Patent
Asokan et al.

(10) Patent No.: US 7,875,822 B2

(45) Date of Patent: Jan. 25, 2011

(54) ABLATIVE-BASED MULTIPHASE CURRENT INTERRUPTER

(75) Inventors: Thangavelu Asokan, Karnataka (IN); Sunil Srinivasa Murthy, Tarnil Nadu (IN); Kunal Ravindra Goray, Karnataka (IN); Nimish Kumar, Jharkhand (IN); Adnan Kutubuddin Bohori, Karnataka (IN)

(73) Assignee: General Electric Company, Niskayuna, NY (US)

( * ) Notice: Subject to any disclaimer, the term of this patent is extended or adjusted under 35 U.S.C. 154(b) by 574 days.

(21) Appl. No.: 11/972,054

(22) Filed: Jan. 10, 2008

(65) Prior Publication Data

US 2009/0179011 A1 Jul. 16, 2009

(51) Int. Cl.

| | |
|---|---|
| ***H01H 33/02*** | (2006.01) |
| ***H01H 33/08*** | (2006.01) |
| ***H01H 9/30*** | (2006.01) |
| ***H01H 33/00*** | (2006.01) |
| ***H01H 9/32*** | (2006.01) |
| ***H02H 3/00*** | (2006.01) |
| ***H02H 7/00*** | (2006.01) |

(52) U.S. Cl. ............................ 218/156; 218/1; 218/43; 218/44; 218/46; 218/47; 218/51; 218/89; 218/90; 218/91; 218/114; 218/149; 218/150; 218/151; 218/152; 218/155; 218/157; 218/158; 335/201; 361/4; 361/5; 361/8; 361/9; 361/13; 361/14

(58) Field of Classification Search ..................... 218/1, 218/43, 44, 46, 47, 51, 89, 90, 91, 114, 149–152, 218/155–158; 361/4, 5, 8, 9, 13, 14, 106; 335/8, 35–38, 102, 106, 201, 202

See application file for complete search history.

(56) References Cited

U.S. PATENT DOCUMENTS

| | | | | |
|---|---|---|---|---|
| 1,825,228 | A * | 9/1931 | Greenwood | 361/14 |
| 2,261,711 | A * | 11/1941 | Behringer | 200/81.4 |
| 3,059,044 | A * | 10/1962 | Friedrich et al. | 174/18 |
| 3,632,926 | A * | 1/1972 | Heft | 218/90 |
| 4,260,213 | A | 4/1981 | Kotski et al. | |
| 4,485,283 | A | 11/1984 | Hurtle | |
| 4,553,008 | A * | 11/1985 | Veverka et al. | 218/56 |
| 4,743,720 | A * | 5/1988 | Takeuchi et al. | 218/24 |
| 5,925,863 | A | 7/1999 | Zehnder et al. | |
| 6,222,147 | B1 * | 4/2001 | Doughty et al. | 218/157 |
| 6,594,126 | B1 * | 7/2003 | Mallonen et al. | 361/13 |
| 6,631,058 | B1 | 10/2003 | Mallonen et al. | |
| 6,667,863 | B1 | 12/2003 | Mallonen et al. | |
| 6,744,001 | B2 | 6/2004 | Dufournet et al. | |
| 7,459,652 | B2 * | 12/2008 | Rival | 218/149 |
| 2007/0119819 | A1 * | 5/2007 | Asokan et al. | 218/90 |
| 2008/0061037 | A1 * | 3/2008 | Asokan et al. | 218/57 |
| 2008/0073326 | A1 * | 3/2008 | Asokan et al. | 218/35 |

* cited by examiner

*Primary Examiner*—Anh T. Mai
*Assistant Examiner*—Mohamad A Musleh
(74) *Attorney, Agent, or Firm*—Richard D. Emery

(57) ABSTRACT

A multiphase current interrupter is provided for interrupting a phase current between two contacts in an electrical phase. The current interrupter includes a first ablative chamber disposed around contacts for a first electrical phase. The first chamber has an ablative material thereon that causes a shock wave when an electrical arc is generated in an arc zone for the first electrical phase during a separation of the contacts therein. The current interrupter further includes at least a second ablative chamber disposed around contacts for at least a second electrical phase. The second chamber has an ablative material thereon that causes a shock wave when an electrical arc is generated in an arc zone for the second electrical phase during a separation of the contacts therein. An interconnecting structure provides fluid communication between the first ablative chamber and the second ablative chamber. The interconnecting structure is adapted to dissipate a shock wave generated in any of the ablative chambers.

19 Claims, 3 Drawing Sheets

ABLATIVE-BASED MULTIPHASE CURRENT INTERRUPTER

FIELD OF THE INVENTION

Embodiments of the present invention are generally related to electrical arc quenching in current interruption devices, and, more particularly, to ablative-based electrical arc quenching, and, even more particularly, to structural arrangements for enhancing structural integrity by distributing a shock wave across a plurality of ablative chambers of the current interrupter, as such shock wave forms during an arc quenching event in a multiphase current interrupter.

BACKGROUND OF THE INVENTION

A variety of devices are known and have been developed for interrupting current between a source and a load. Circuit breakers are one type of device designed to trip upon occurrence of heating or over-current conditions. Other circuit interrupters trip either automatically or by implementation of a tripping algorithm, such as to limit current to desired levels, limit power through the device in the event of phase loss or a ground fault condition. In general, such devices include one or more moveable contacts, which separate from mating contacts to interrupt a current carrying path.

Performance of a circuit interrupter is typically dictated by a peak let through current, which is in turn controlled by a rate of arc voltage development across the contacts as the contacts are moved away from one another during a circuit interruption event. Accordingly, improvement of circuit interrupter performance has focused on more rapidly increasing arc voltage development to limit a peak let though current. A wide range of techniques has been employed for improving interruption times to limit the let-through energy, such as by providing faster contact separation. The arc voltage may be made to rise very quickly to cause a corresponding rapid interruption of the current. Another technique used to limit the let-through energy is to provide arc dissipating structures, such as conductive plates arranged with air gaps between each plate, commonly known as an arc chute. Entry of the arc into such structures may assist in extinguishing the arc and thereby limit the let-through energy during circuit interruption.

BRIEF DESCRIPTION OF THE INVENTION

Generally, aspects of the present invention provide a multiphase current interrupter for interrupting a phase current between two contacts in an electrical phase. The current interrupter includes a first ablative chamber disposed around contacts for a first electrical phase. The first chamber has an ablative material thereon that causes a shock wave when an electrical arc is generated in an arc zone for the first electrical phase during a separation of the contacts therein. The current interrupter further includes at least a second ablative chamber disposed around contacts for at least a second electrical phase. The second chamber has an ablative material thereon that causes a shock wave when an electrical arc is generated in an arc zone for the second electrical phase during a separation of the contacts therein. An interconnecting structure provides fluid communication between the first ablative chamber and the second ablative chamber. The interconnecting structure is adapted to dissipate a shock wave generated in any of the ablative chambers.

Further aspects of the present invention provide a three-phase circuit breaker including a respective current interrupter for interrupting a phase current between two contacts in an electrical phase. The circuit breaker includes a first ablative chamber disposed around contacts for a first electrical phase. The first chamber has an ablative material thereon that causes a shock wave when an electrical arc is generated in an arc zone for the first electrical phase during a separation of the contacts therein. A second ablative chamber is disposed around contacts for a second electrical phase. The second chamber has an ablative material thereon that causes a shock wave when an electrical arc is generated in an arc zone for the second electrical phase during a separation of the contacts therein. A third ablative chamber is disposed around contacts for a third electrical phase. The third chamber has an ablative material thereon that causes a shock wave when an electrical arc is generated in an arc zone for the third electrical phase during a separation of the contacts therein. An interconnecting structure provides fluid communication between each of the ablative chambers. The interconnecting structure is adapted to dissipate a shock wave generated in any one of said ablative chambers.

DETAILED DESCRIPTION OF THE INVENTION

Figure 1:
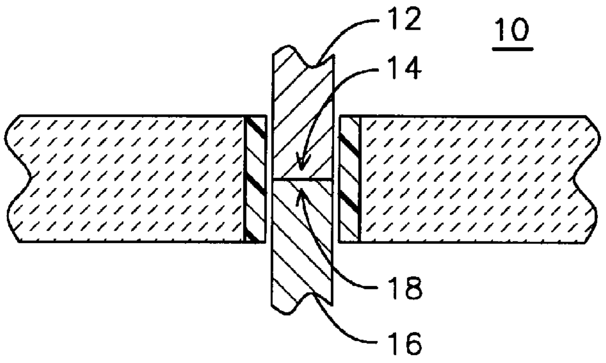
FIG. 1 shows a partial cross sectional schematic view of an example embodiment of an ablative-based circuit interrupter in a current conducting mode.

FIG. 1 shows a partial cross sectional schematic view of an example of an ablative-based circuit interrupter 10 in a current conducting mode. The circuit interrupter 10 may include a first conducting element, or first contact 12, having a contacting end portion 14, and a second conducting element, or second contact 16, having a respective contacting end portion 18. When the contacts 12, 16 are positioned in electrical contact with one another, such as when the contacting end portions are abutting, an electrical current may be conducted between the elements 12, 16. The first contact 12 and second contact 16 may be separable away from one another to interrupt an electrical current flowing between them. For example, the second contact 16 may be movable out of electrical contact with the first contact 12 to interrupt the electrical current, the first contact 12 may be movable out of electrical contact with the second contact 16 to interrupt the electrical current, or both contacts 12, 16 may be movable out of electrical contact with each other to interrupt the electrical current.

Figure 2:
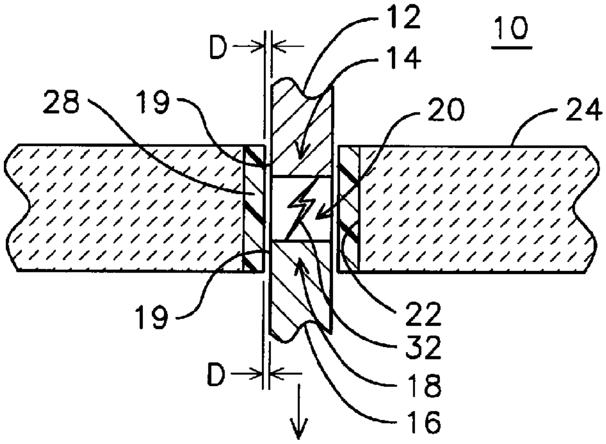
FIG. 2 shows a partial cross sectional schematic view of the example embodiment of the circuit interrupter of FIG. 1 at a beginning of a current interruption mode.

As shown in FIG. 2, the circuit interrupter 10 includes an arc zone 20 where an electrical arc discharge may occur when electrical contacts 12 and/or 16 move to interrupt the current. Arc zone 20 may be disposed around the contacts 12, 16, such as around respective end portions 14, 18 of the contacts 12, 16. Arc zone 20 may be defined by a wall 22 in an aperture formed in an insulator 24, such as, but not limited to, a ceramic plate, a polymer plate, a plastic composite plate or combination of these material, disposed around the contacts 12, 16.

An ablative material 28 may be disposed in the arc zone 20 for producing a relatively fast pressure increase (e.g., a shock wave) in arc zone 20, such as may contribute to force separation of the contacts 12, 16. The increased pressure may be generated in response to an arc 32 formed between the contacts 12, 16. When the contacts 12, 16 are initially separated from being in electrical contact as shown in FIG. 2, the arc 32 formed in the arc zone 20 there between generates gases (e.g., vapors) in part by the heat and/or radiation generated by the arc 32 acting on the ablative material 28 lining the walls 22. The vapor generated by the ablating process in turn causes a pressure increase in the arc zone 20 resulting in force acting on the contacts 12, 16 to move at least one of the contacts (e.g., 16) away from the other contact 12 and out of arc zone 20 at an end of a current interruption mode.

As shown in FIG. 2, the ablative material 28 may be configured to line a wall 22 of arc zone 20 around the end portions 14, 18 of the contacts 12, 16. The ablative material 28 may abut the sides 19 of the contacts 12, 16, or may be spaced away a sufficiently small clearance distance, D, to achieve a desired reduced let-through current limiting performance. The ablative material 28 may include polymers such as polytetrafluoroethylene (PTFE), polyethylene, polyimide, polyamide, or poly-oxymethylene (POM), epoxide, polyester, polypropylene, poly methyl-methacralate, poly acetal, polysulphones, phenolic resin, phenolic resin composite, polyetherimide, polyether ketone, polypropylene sulphide-based polymers. Such polymers may also include organic and/or inorganic fillers and/or additives to achieve, for example, desired ablating properties. In an embodiment, the ablative material 28 may comprise a tubular insert disposed in the aperture. The preceding description may be viewed as foundational description as may be broadly applicable to any generic ablative-based current interrupter and will now proceed to describe example embodiments of the circuit interrupter 10 configured in accordance with aspects of the present invention. For readers desirous of further background information in connection with further examples of ablative-based current interrupters, reference is made to U.S. patent application Ser. No. 11/289,933, assigned to the same assignee of the present invention and herein incorporated by reference in its entirety.

Figure 3:
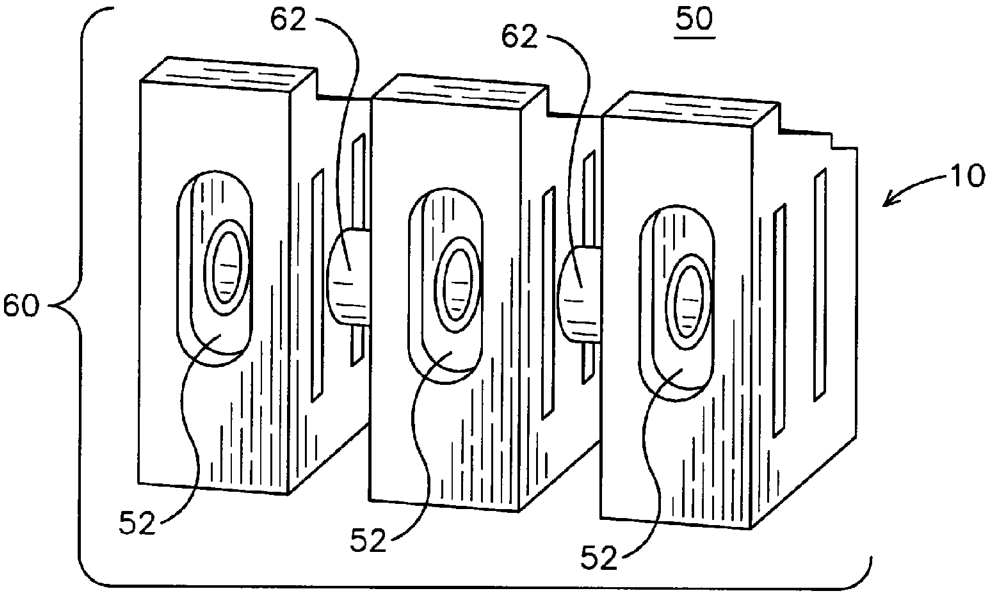
FIG. 3 illustrates a generally frontal isometric view of an example multiphase circuit breaker (e.g., a three-phase circuit breaker) with ablative chambers interconnected in accordance with aspects of the present invention.

FIG. 3 illustrates a generally frontal isometric view of an example multiphase circuit breaker 50 (e.g., a three-phase circuit breaker) configured in accordance with aspects of the present invention. Multiphase circuit breaker 50 may be based on an embodiment of circuit interrupter 10. In this example embodiment, circuit breaker 50 may include three distinct ablative chambers 52, each housing a respective circuit interrupter connected to a respective electrical phase of a three phase circuit (not shown). It should be understood that a multiphase circuit breaker embodying aspects of the present invention is not limited to three ablative chambers, and, in a general case, may include two or more chambers based on the specific number of electrical phases used in a given circuit breaker application.

The inventors of the present invention have observed that in a multiphase circuit breaker, the phase current flow across each of the phases generally reaches a peak value at different instants in time. That is, the peak value for each phase current does not occur at the same instant in time. Thus, in the event of an electrical arc discharge, each ablative chamber may experience a peak pressure at a different instant in time. Moreover, in certain arcing situations, the pressure raise that develops in a given one of the ablative chambers may reach a peak ahead in time of a pressure raise in the remaining ablative chambers. The above-discussed timing relationships regarding the occurrence of phase peak currents and chamber peak pressures in a three-phase circuit breaker may be observed in the example current and pressure waveforms respectively shown in FIGS. 6 and 7.

The inventors of the present invention have innovatively recognized that the foregoing timing characteristics, (i.e., the temporal asymmetry in connection with the occurrence of phase peak currents and resulting peak pressures) that can occur during an arcing event in a multiphase circuit breaker can provide an opportunity to reduce the magnitude of the peak pressure that can develop in any given one of the ablative chambers of a multiphase circuit breaker. In one example embodiment, this reduction is accomplished through equalization (e.g., dissipation of the shock wave) of pressure across each of the ablative chambers. This may be realized in a multiphase circuit breaker by allowing the shock wave (e.g., the ablative vapors) formed in a given ablative chamber to expand to the remaining ablative chambers by way of an interconnecting structure 60 configured to interconnect (e.g., a fluid coupling interconnection) each of the plurality of ablative chambers with one another.

One example embodiment for interconnecting structure 60 may be appreciated in FIG. 3 where respective interconnecting conduits 62 are provided between adjacent ablative chambers. The respective inner surfaces of conduits 62 may be lined with ablative material 28 for providing an incremental performance in arc quenching. In one example embodiment, ablative chambers 52 and interconnecting structure 60 may comprise an integral structure, such as may be constructed using a suitable casting process. In another example embodiment, interconnecting structure 60 may be an add-on structure connected to one or more of the ablative chambers at a suitable stage of an assembly process, e.g., welding, mechanical fit, etc. Each of the ablative chambers may include a suitable venting arrangement for venting ablative emissions (e.g., ablative vapors) to a surrounding environment, e.g., vents in communication with the surrounding environment.

Figure 4:
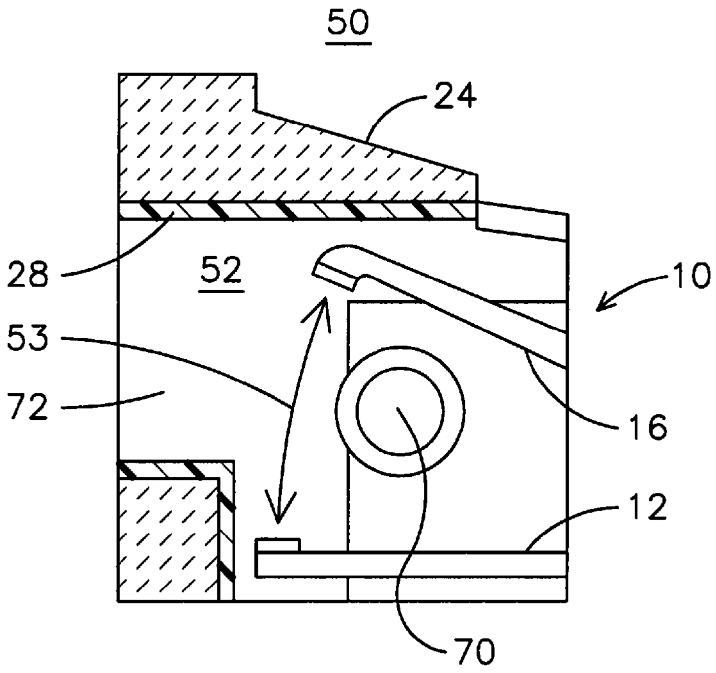
FIGS. 4 and 5 each shows a respective schematic of a circuit interrupter housed in a respective ablative chamber embodying aspects of the present invention.
Figure 5:
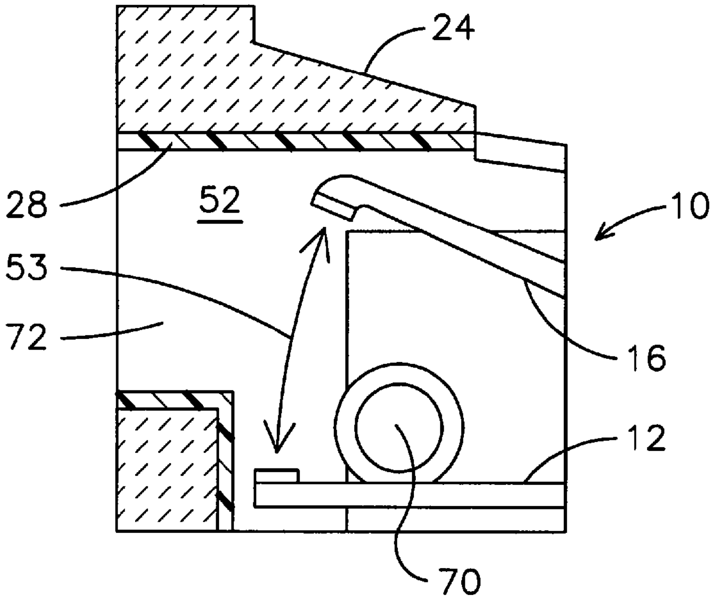

FIG. 4 shows a schematic of an example circuit interrupter 10 housed in an ablative chamber 52 embodying aspects of the present invention. As shown in FIG. 4, circuit interrupter 10 includes a stationary contact 12 and a movable contact 16 disposed in an ablative chamber 52 in breaker 50. The movable contact 16 is movable (as conceptually represented by arrow 53) into and out of electrical contact with stationary contact 12, so that when the contacts 12, 16 are positioned in electrical contact, electrical power is provided to an electrical load (not shown). The walls in ablative chamber 52 may be lined with an ablative material 28, such as PTFE or other ablative material described previously. The movable contact 16 is moveable to provide circuit interrupting performance as described above. An aperture 70, may be disposed on a lateral wall 72 of chamber 53. Aperture 70 may provide fluid communication though interconnecting arrangement 60 (FIG. 3) with each of the remaining ablative chambers 52 associated with the multi-phase circuit breaker. It will be appreciated that aperture 70 can be provided at different locations along the arc zone, such as a center location relative to the arc zone, or a non-central location relative to the arc zone, such as shown in FIG. 5. It will be appreciated that interconnecting arrangement 60 need not be provided through the lateral walls of the chambers. For example, it is contemplated that such interconnecting arrangement could be provided through a top wall of the chambers.

Figure 7:
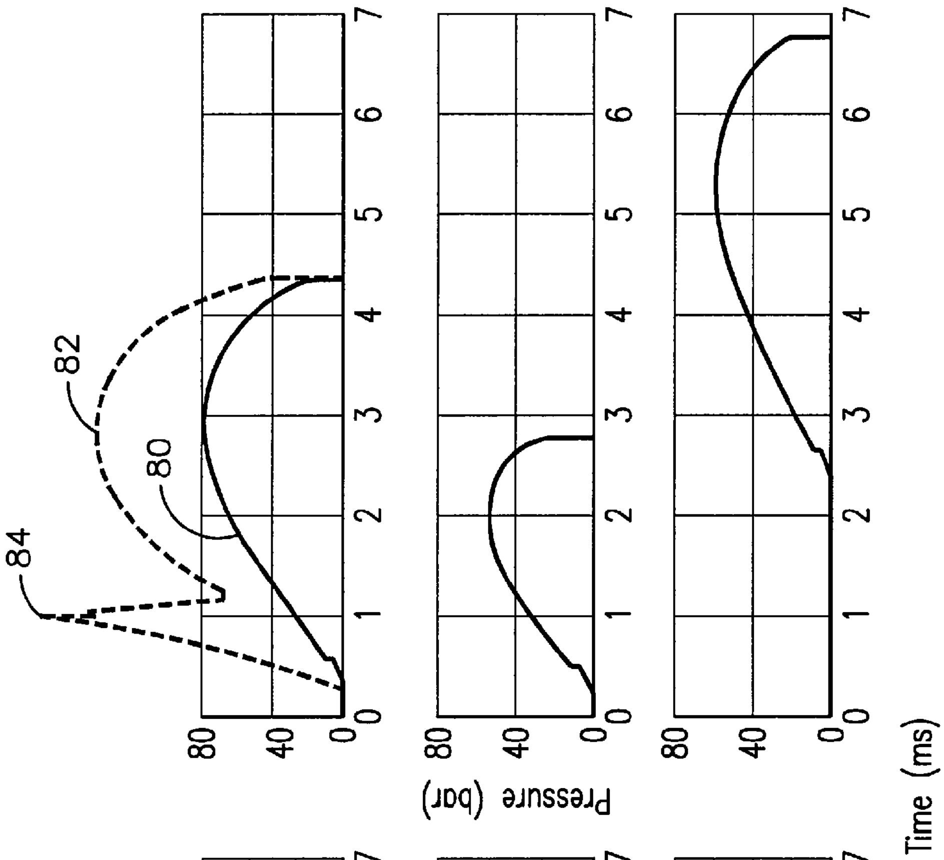
FIGS. 6 and 7 show plots of example waveforms of phase current and pressure as may form during an arcing event in a three-phase circuit breaker.
Figure 6:
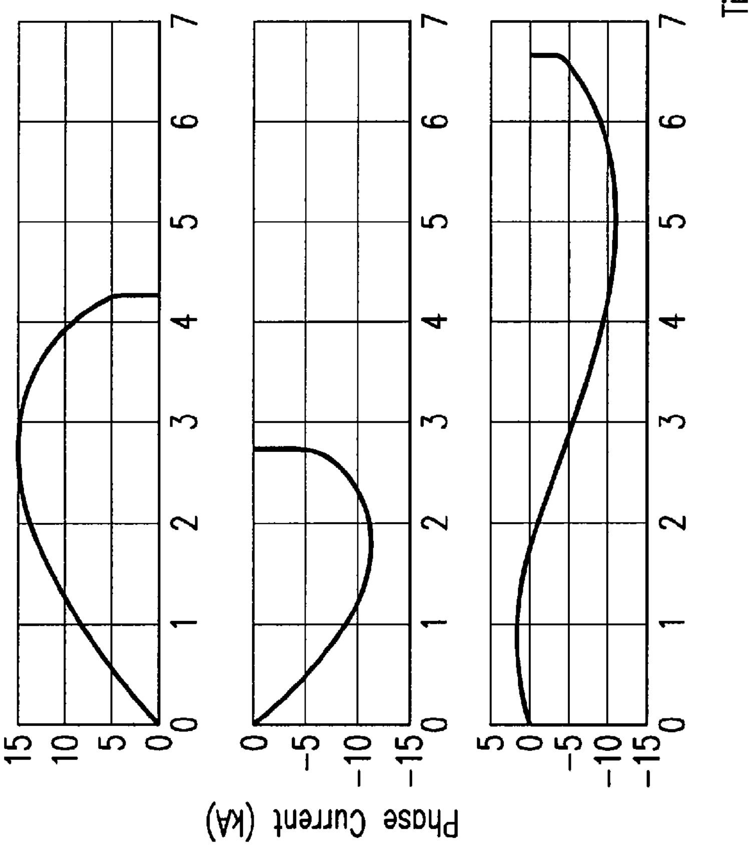

FIGS. 6 and 7 show respective example waveforms as a function of time of each phase current and pressure, as may form during an arcing event in a three-phase circuit breaker. For the sake of an example comparison of some the advantages gained through aspects of the present invention, in FIG. 7, a waveform 80 represents pressure during an arcing event in an ablative chamber interconnected to other chambers through an interconnecting structure 60 (FIG. 3) in accordance with aspects of the present invention. Also in FIG. 7, a waveform 82 (shown in dashed line) represents a pressure during an equivalent arcing event. However, by way of contrast, waveform 82 corresponds to an ablative chamber without an interconnecting arrangement. Based on real world data, a resulting peak pressure 84 can lead to structural flaws in the walls of such an unconnected chamber.

In operation, a multiphase circuit breaker, with interconnected ablative chambers, in accordance with aspects of the present invention allows to effectively increase the volume available for shock wave dissipation and peak pressure reduction, thus enhancing structural integrity of the circuit breaker. Moreover, it has been analytically and experimentally observed that the incremental expansion of ablative gases across each of the plurality of ablative chambers is conducive to enhanced arc cooling and improved electrical performance. In addition, a multiphase circuit breaker with interconnected ablative chambers eliminates a need for incorporating relatively large vents in each individual chamber for relieving the generated shockwave to the surrounding environment. Generally, large vents tend to reduce the volume effectively available for performing ablation thus adversely affecting the arc-quenching performance of the breaker. Accordingly, it should be appreciated from the foregoing description that the inventors of the present invention have enabled a practical and relatively low-cost solution to various issues associated with ablative-based multiphase current interrupters.

While certain embodiments of the present invention have been shown and described herein, such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A multiphase current interrupter for interrupting a phase current between two contacts in an electrical phase, said current interrupter comprising:

a first ablative chamber disposed around contacts for a first electrical phase, said first chamber having an ablative material thereon that causes a shock wave when an electrical arc is generated in an arc zone for the first electrical phase during a separation of the contacts therein;

at least a second ablative chamber disposed around contacts for at least a second electrical phase, said at least second chamber having an ablative material thereon that causes a shock wave when an electrical arc is generated in an arc zone for said second electrical phase during a separation of the contacts therein; and an interconnecting structure to provide fluid communication between the first ablative chamber and said at least second ablative chamber, the interconnecting structure adapted to dissipate at least one of the shock wave generated in said first ablative chamber or the shock wave generated in said second ablative chamber, wherein said interconnecting structure comprises at least one conduit passing from an aperture in a wall of the first ablative chamber to an aperture in a wall of said at least second ablative chamber, and wherein an interior surface of said at least one conduit is lined with an ablative material.

2. The multiphase current interrupter of claim 1 wherein each aperture is centrally disposed relative to a respective one of said arc zone for said first electrical phase and said arc zone for said second electrical phase.

3. The multiphase current interrupter of claim 1 wherein each aperture is non-centrally disposed relative to a respective one of said arc zone for said first electrical phase and said arc zone for said second electrical phase.

4. The multiphase current interrupter of claim 1 wherein said wall comprises a lateral wall of each chamber.

5. The multiphase current interrupter of claim 1 wherein said wall comprises an upper wall of each chamber.

6. The multiphase current interrupter of claim 1 wherein the first ablative chamber, said at least second ablative chamber and the interconnecting structure comprise an integral structure.

7. The multiphase current interrupter of claim 1 wherein the interconnecting structure comprises an add-on structure relative to at least one of said ablative chambers.

8. The multiphase current interrupter of claim 1 wherein the interconnecting structure comprises an add-on structure relative to each of the ablative chambers.

9. The multiphase current interrupter of claim 1 wherein each of the ablative chambers further comprises a venting arrangement for venting ablative vapors to a surrounding environment.

10. A three-phase circuit breaker including a respective current interrupter for interrupting a phase current between two contacts in an electrical phase, said circuit breaker comprising:

a first ablative chamber disposed around contacts for a first electrical phase, said first chamber having an ablative material thereon that causes a shock wave when an electrical arc is generated in an arc zone for the first electrical phase during a separation of the contacts therein;

a second ablative chamber disposed around contacts for a second electrical phase, said second chamber having an ablative material thereon that causes a shock wave when an electrical arc is generated in an arc zone for the second electrical phase during a separation of the contacts therein;

a third ablative chamber disposed around contacts for a third electrical phase, said third chamber having an ablative material thereon that causes a shock wave when an electrical arc is generated in an arc zone for the third electrical phase during a separation of the contacts therein; and an interconnecting structure to provide fluid communication between each of the ablative chambers, the interconnecting structure adapted to dissipate at least one of the shock wave generated in said first ablative chamber, the shock wave generated in said second ablative chamber, or the shock wave generated in said third ablative chamber, wherein said interconnecting structure further comprises a second conduit passing from an aperture in a wall of the second chamber to an aperture in a wall of the third ablative chamber, and wherein an interior surface of each conduit is lined with an ablative material.

11. The circuit breaker of claim 10 wherein said interconnecting structure further comprises a second conduit passing from an aperture in a wall of the second chamber to an aperture in a wall of the third ablative chamber.

12. The circuit breaker of claim 10 wherein at least one aperture is centrally disposed relative to a respective one of said arc zone for said first electrical phase, said arc zone for said second electrical phase, and said arc zone for said third electrical phase.

13. The circuit breaker of claim 10 wherein at least one aperture is non-centrally disposed relative to a respective one of said arc zone for said first electrical phase, said arc zone for said second electrical phase, and said arc zone for said third electrical phase.

14. The circuit breaker of claim 10 wherein each of said walls comprises at least a lateral wall of each chamber.

15. The circuit breaker of claim 10 wherein each of said walls comprises at least an upper wall of each chamber.

16. The circuit breaker of claim 10 wherein each of the ablative chambers and the interconnecting structure comprise an integral structure.

17. The circuit breaker of claim 10 wherein the interconnecting structure comprises at least an add-on structure relative to at least one of said ablative chambers.

18. The circuit breaker of claim 10 wherein the interconnecting structure comprises an add-on structure relative to each of the ablative chambers.

19. The circuit breaker of claim 10 wherein each of the ablative chambers further comprises a venting arrangement for venting ablative vapors to a surrounding environment.

* * * * *

UNITED STATES PATENT AND TRADEMARK OFFICE

CERTIFICATE OF CORRECTION

PATENT NO. : 7,875,822 B2
APPLICATION NO. : 11/972054
DATED : January 25, 2011
INVENTOR(S) : Asokan et al.

It is certified that error appears in the above-identified patent and that said Letters Patent is hereby corrected as shown below:

On the Title Page, in Item (75), under “Inventors”, in Column 1, Line 2, delete “Tarnil” and insert -- Tamil --, therefor.

In Column 3, Line 29, delete “polysulphones,” and insert -- polysulfones, --, therefor.

Signed and Sealed this
Nineteenth Day of April, 2011

David J. Kappos
*Director of the United States Patent and Trademark Office*